US008870403B2

(12) United States Patent
Tsai et al.

(10) Patent No.: US 8,870,403 B2
(45) Date of Patent: Oct. 28, 2014

(54) HANDHELD ELECTRONIC DEVICE AND FLASHLIGHT MODULE

(75) Inventors: Meng-Han Tsai, Taoyuan County (TW); Chung-Jung Wu, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 256 days.

(21) Appl. No.: 13/335,976

(22) Filed: Dec. 23, 2011

(65) Prior Publication Data

US 2013/0163229 A1 Jun. 27, 2013

(51) Int. Cl.
*F21L 4/00* (2006.01)

(52) U.S. Cl.
USPC .............................. 362/109; 362/188; 362/208

(58) Field of Classification Search
USPC ........... 362/88, 109, 186, 188, 190, 200, 208; 455/575.1
See application file for complete search history.

(56) References Cited

U.S. PATENT DOCUMENTS 6,871,977 B2 * 3/2005 Osawa .......................... 362/602
2009/0323262 A1 * 12/2009 Arita ........................ 361/679.01

FOREIGN PATENT DOCUMENTS

CN 1448765 10/2003
CN 101529545 9/2009

OTHER PUBLICATIONS

"First Office Action of China Counterpart Application", issued on May 5, 2014, p. 1-p. 8, in which the listed references were cited.

* cited by examiner

*Primary Examiner* — Thomas M Sember
(74) *Attorney, Agent, or Firm* — Jianq Chyun IP Office

(57) ABSTRACT

A handheld electronic device and a flashlight module are provided. The handheld electronic device includes a housing, a circuit board, a flashlight element and an elastic conductive terminal set, wherein the flashlight element and the elastic conductive terminal set together form the flashlight module. The housing has an accommodating opening. The circuit board is disposed at a bottom of the housing. The flashlight element is inserted into the accommodating opening. The elastic conductive terminal set is disposed between the circuit board and the flashlight element. The circuit board and the flashlight element are electrically interconnected through the elastic conductive terminal set. A distance is formed between the circuit board and the flashlight element, and the distance is adjustable by the elastic conductive terminal set.

28 Claims, 3 Drawing Sheets

HANDHELD ELECTRONIC DEVICE AND FLASHLIGHT MODULE

BACKGROUND OF THE DISCLOSURE

1. Technical Field

The present disclosure relates to an electronic device and a flashlight module, and more particularly, to a handheld electronic device and a flashlight module thereof.

2. Background

With the development of science and technology, many handheld electronic devices, such as, mobile phones and tablet PCs, have come into the market. These handheld electronic devices not only facilitate our daily lives, but they also play an important role in our daily lives.

Taking the mobile phone as an example, in addition to the conventional call function, current mobile phones are largely equipped with a camera function. When it is desired to take a photo as a memento, a user may take a digital photo with a mobile phone having the camera function. If the environment light is insufficient or the light direction is not ideal, a flashlight device of the mobile phone may be activated acting as a supplement light for the object to be shot.

In general, the flashlight device of the mobile phone consists of a light emitting element (e.g. a light emitting diode) and a light-transmissive cover (e.g. a glass or transparent plastic cover). However, in the conventional flashlight device, the light emitting element is assembled on and electrically connected with a circuit board of the mobile phone, and the light-transmissive cover needs to match the shape and thickness of the mobile phone to be assembled to a housing of the mobile phone. Therefore, the light-transmissive cover needs to be re-designed for mobile phones having different shapes and thickness so as to meet the shape and thickness requirements. As a result, the conventional design may not satisfy the universal design principle. In addition, the light emitting element and the light-transmissive cover are assembled to different parts, respectively, which is disadvantageous in reducing an assembly error between the light emitting element and the light-transmissive cover. Therefore, how to solve the above-mentioned problems is a subject to research for relevant vendors.

SUMMARY

Accordingly, the present disclosure is directed to a handheld electronic device in which an adjustable distance is formed between a flashlight element and a circuit board thereof.

The present disclosure is also directed to a flashlight module which is spaced an adjustable distance from a circuit board to which the flashlight module is to be electrically connected.

The present disclosure provides a handheld electronic device including a housing, a circuit board, a flashlight element and an elastic conductive terminal set. The housing has an accommodating opening. The circuit board is disposed at a bottom of the housing. The flashlight element is inserted into the accommodating opening The elastic conductive terminal set is disposed between the circuit board and the flashlight element. The circuit board and the flashlight element are electrically interconnected through the elastic conductive terminal set. A distance is formed between the circuit board and the flashlight element, and the distance is adjustable by the elastic conductive terminal set.

The present disclosure provides a flashlight module adapted for a handheld electronic device. The handheld electronic device includes a housing and a circuit board. The housing has an accommodating opening. The flashlight module includes a flashlight element and an elastic conductive terminal set. The flashlight element is inserted into the accommodating opening. The elastic conductive terminal set is disposed between the circuit board and the flashlight element. The circuit board and the flashlight element are electrically interconnected through the elastic conductive terminal set. A distance is formed between the circuit board and the flashlight element, and the distance is adjustable by the elastic conductive terminal set.

In view of the foregoing, in the present disclosure, the elastic conductive terminal set is disposed between the flashlight element and circuit board, such that a distance is formed between the circuit board and the flashlight element. Therefore, the flashlight element may be applied in different handheld electronic devices having different shapes and thickness, thereby satisfying the universal design principles.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DETAILED DESCRIPTION

Figure 1:
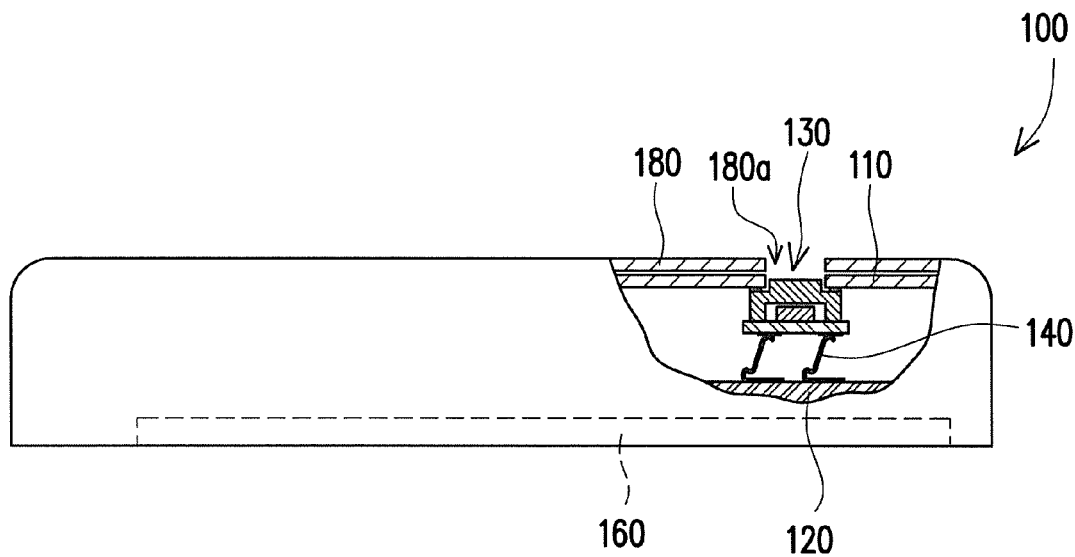
FIG. 1 a schematic view illustrating a handheld electronic device according to an embodiment of the present disclosure.
Figure 2:
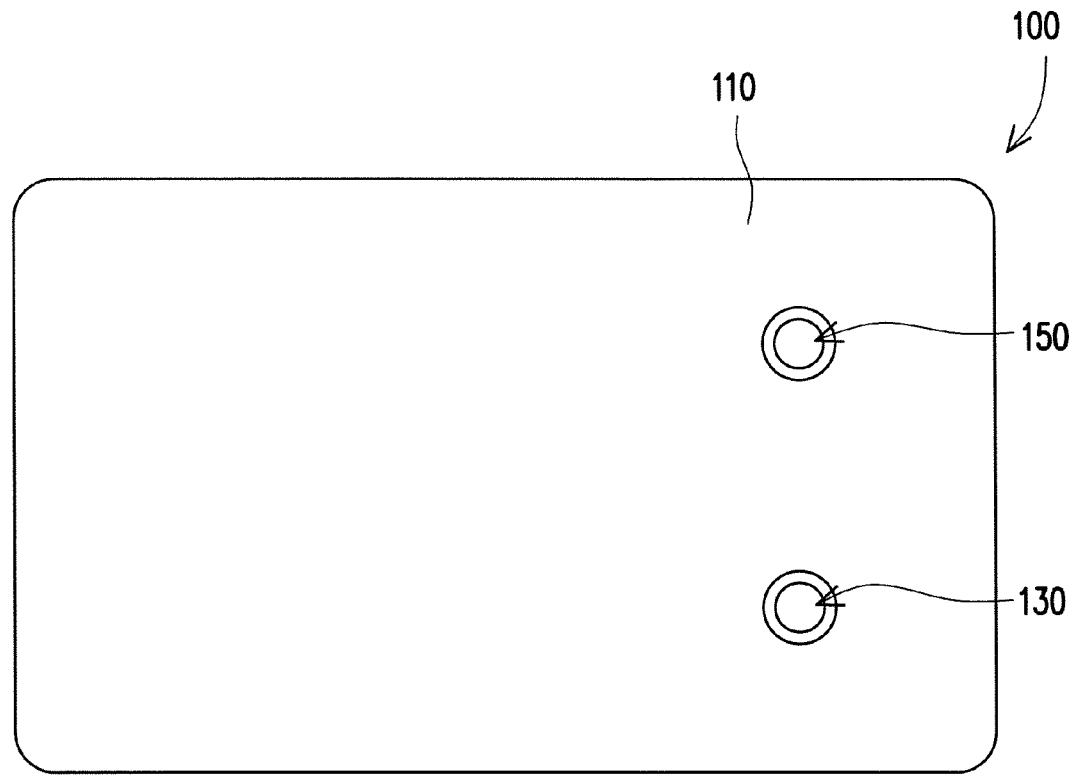
FIG. 2 is a top view of the handheld electronic device of FIG. 1, with an outer cover thereof being removed.
Figure 3:
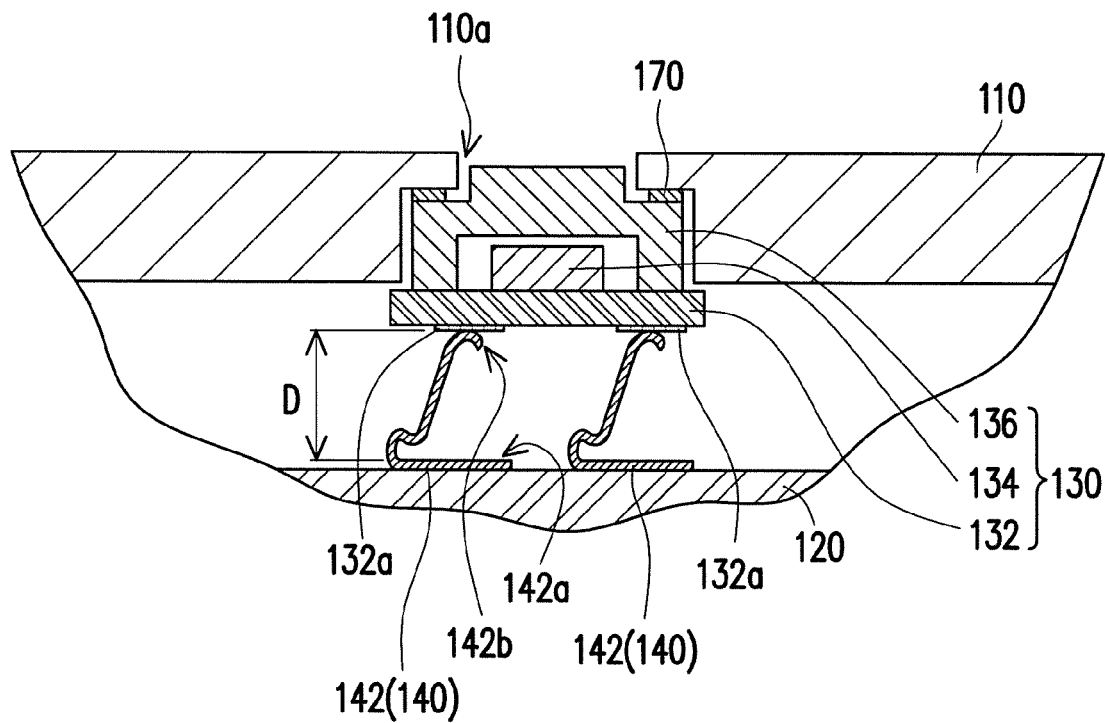
FIG. 3 is a partial enlarged view of the handheld electronic device of FIG. 1.

FIG. 1 a schematic view illustrating a handheld electronic device according to an embodiment of the present disclosure. FIG. 2 is a top view of the handheld electronic device of FIG. 1, with an outer cover thereof being removed. FIG. 3 is a partial enlarged view of the handheld electronic device of FIG. 1. Referring to FIG. 1, FIG. 2 and FIG. 3, in the present embodiment, the handheld electronic device 100 includes a housing 110, a circuit board 120, a flashlight element 130 and an elastic conductive terminal set 140. The flashlight element 130 and the elastic conductive terminal set 140 together form a flashlight module. In addition, the handheld electronic device 100 is, for example, a mobile phone or a tablet PC that has camera and flashlight function. The handheld electronic device 100 further includes a camera 150 and a display 160. The camera 150 and the display 160 are mounted to the housing 110 and electrically connected with the circuit board 120. When a user take a photo, an object may be photographed using the camera 150 in combination with the flashlight element 130, and the photo may be displayed on the display 160. In addition, the handheld electronic device 100 of the present embodiment may further include an outer cover 180 with a displaying opening 180a. When the outer cover 180 and the housing 110 are assembled, a portion of the flashlight element 130 is exposed through the displaying opening 180a.

The housing 110 has an accommodating opening 110a. The circuit board 120 is disposed at a bottom of the housing 110. The flashlight element 130 is inserted into the accommodating opening 110a. The elastic conductive terminal set 140 is disposed between the circuit board 120 and the flashlight element 130. The circuit board 120 and the flashlight element 130 are electrically interconnected through the elastic conductive terminal set 140. A distance D is formed between the circuit board 120 and the flashlight element 130, and this distance D is adjustable by the elastic conductive terminal set 140. Specifically, after the flashlight element 130 is inserted into the accommodating opening 110a and assembled with the housing 110, the flashlight element 130 and the circuit board 120 may be spaced a distance D by the elastic conductive terminal set 140. Due to the elasticity of the elastic conductive terminal set 140, the elastic conductive terminal set 140 is compressible, such that the distance D is adjustable. Therefore, the flashlight element 130 may be applied in different handheld electronic devices having different shapes and thickness, thereby satisfying the universal design principles and hence reducing the fabrication cost.

The flashlight element 130 of this embodiment includes a substrate 132, a light emitting diode 134 and a cover 136. The substrate 132 abuts the elastic conductive terminal set 140. The light emitting diode 134 is mounted and electrically connected to the substrate 132. A plurality of electrodes 132a is provided at a bottom side of the substrate 132, which acts as a conductive medium between the light emitting diode 134 and the circuit board 120. The cover 136 is mounted to the substrate 132 and assembled in the accommodating opening 110a. The light emitting diode 134 provides a light that emits out through the cover 136. As such, commonly assembling the light emitting diode 134 and the cover 136 to the housing 110 may reduce an assembly error that would be accumulated in assembling the light emitting diode 134 and the cover 136 to different parts and therefore increase assembly quality. In addition, the material of the cover 136 of this embodiment may be a light-transmissive material, such as, glass or transparent plastic, to allow the light provided by the light emitting diode 134 to pass therethrough.

In addition, the handheld electronic device 100 of this embodiment may further include an adhesive tape 170 which is adhered between the housing 110 and the cover 136 to limit movement of the flashlight element 130 relative to the housing 110. However, the mounting of the flashlight element 130 and the housing 110 is not limited to the adhesive manner. Below, the mounting of the flashlight element 130 and the housing 110 is further described by way of examples.

Figure 4:
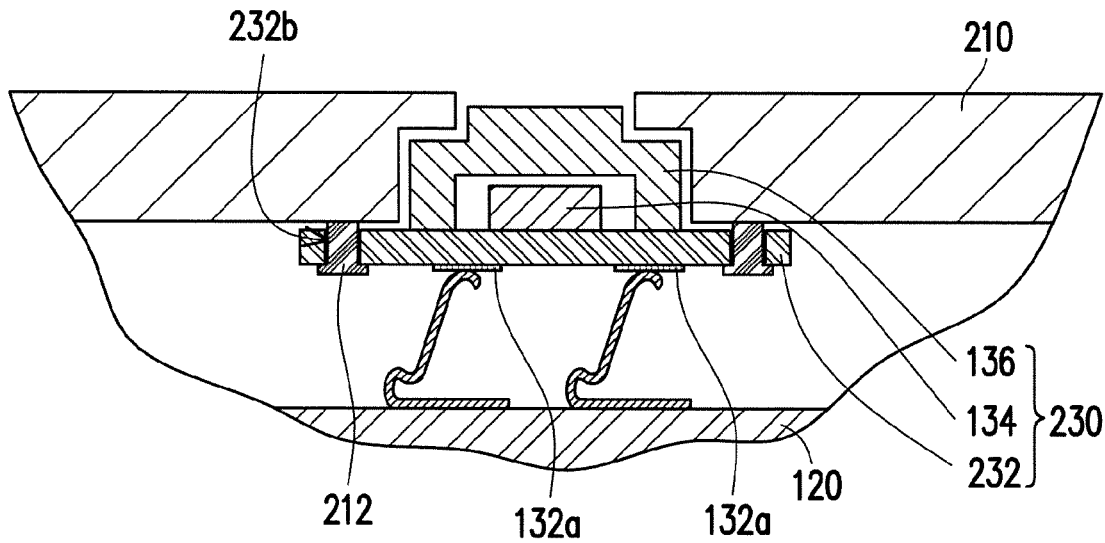
FIG. 4 a schematic view illustrating the mounting of a housing and a flashlight element according to another embodiment of the present disclosure.

FIG. 4 a schematic view illustrating the mounting of a housing and a flashlight element according to another embodiment of the present disclosure. In this embodiment, the housing 210 and the flashlight element 230 are similar to the housing 110 and the flashlight element 130 of FIG. 3. Only differences therebetween the present embodiment and the embodiment of FIG. 3 are described herein, where the same or similar reference numerals denote the same or similar elements. Referring to FIG. 3 and FIG. 4, the housing 210 of the present embodiment includes a positioning pin 212, and the substrate 232 has a positioning hole 232b positioned in correspondence with the positioning pin 212. The positioning pin 212 and the positioning hole 232b are engaged to limit movement of the flashlight element 230 relative to the housing 210. After the positioning pin 212 is lockingly engaged in the positioning hole 232b, the positioning pin 212 may be hot-melted using a hot melting machine (not shown) to strengthen the mounting of the flashlight element 230 and the housing 210.

Referring to FIG. 3, the elastic conductive terminal set 140 of the present embodiment includes a plurality of elastic conductive terminals 142. There elastic conductive terminals 142 contacts the two electrodes 132a of the substrate 132 to act as a positive electrode and a negative electrode of the light emitting diode 134 that are in electrical connection with the circuit board 120. Each elastic conductive terminal 142 includes a first end 142a and a second end 142b. In addition, the first end 142a of each elastic conductive terminal 142 of present embodiment is mounted to the circuit board 120, and the second end 142a of each elastic conductive terminal 142 of present embodiment leans against the substrate 132 of the flashlight element 130.

Figure 5:
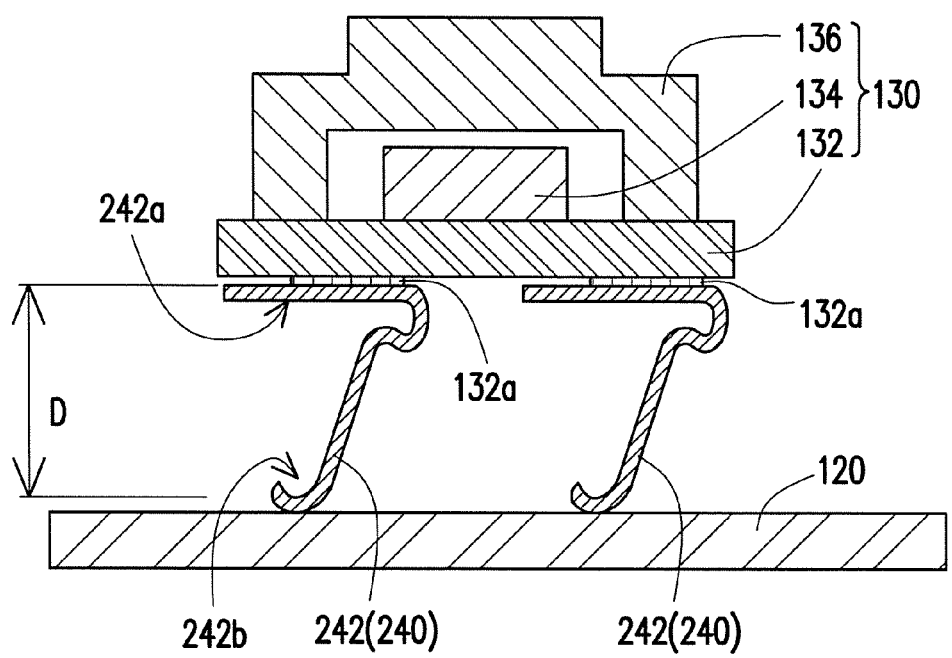
FIG. 5 illustrates the elastic conductive terminal set disposed with respect to the circuit and flashlight element according to a modified embodiment of the present disclosure.

FIG. 5 illustrates the elastic conductive terminal set disposed with respect to the circuit and flashlight element according to a modified embodiment of the present disclosure. It is noted, however, that, for clarity, the housing is omitted in FIG. 5 and the same or similar reference numbers of FIG. 5 denote the same or similar elements of FIG. 3. Referring to FIG. 3 and FIG. 5, in the present embodiment, a first end 242a of each elastic conductive terminal 242 of an elastic conductive terminal set 240 is mounted to the flashlight element 130, and a second end 242b of each elastic conductive terminal 242 of the elastic conductive terminal set 240 leans against the circuit board 120. Therefore, in FIG. 3, the elastic conductive terminal set 140 is mounted to the circuit board 120 and the flashlight element 130 compresses the elastic conductive terminal set 140 to adjust the distance D. In contrast, in FIG. 5, the elastic conductive terminal set 240 is mounted to the flashlight element 130, and the circuit board 120 compresses the elastic conductive terminal set 240 to adjust the distance D. Thus, the elastic conductive terminal set may be mounted to the circuit board or flashlight element depending upon actual requirements.

In summary, in the present disclosure, the elastic conductive terminal set is disposed between the circuit board and the flashlight element such that a distance is formed between the circuit board and the flashlight element. In addition, due to the elasticity of the elastic conductive terminal set, the elastic conductive terminal set is compressible, such that the distance is adjustable. Therefore, the flashlight element may be applied in different handheld electronic devices having different shapes and thickness, thereby satisfying the universal design principles and hence reducing the fabrication cost. Further, the light emitting diode and the cover of the flashlight element are commonly assembled to the housing, which may reduce an assembly error that would be accumulated in assembling the light emitting diode and the cover to different parts and therefore increase assembly quality.

It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A handheld electronic device comprising:
   a housing, having an accommodating opening;
   a circuit board, disposed at a bottom of the housing;
   a flashlight element, inserted into the accommodating opening; and
   an elastic conductive terminal set, disposed between the circuit board and the flashlight element, wherein the circuit board and the flashlight element are electrically interconnected through the elastic conductive terminal set, a distance is formed between the circuit board and the flashlight element, and the distance is adjustable by the elastic conductive terminal set, wherein the flashlight element comprises:
a substrate, abutting the elastic conductive terminal set;
a light emitting diode, mounted to the substrate; and
a cover, mounted to the substrate and assembled into the accommodating opening, wherein the light emitting diode is located between the substrate and the cover and is covered by the cover, the light emitted from the light emitting diode of the flashlight element is perpendicular to the circuit board, and the light from the light emitting diode directly passes through the cover, and the light guided by the accommodating opening is directly emitted out of the handheld electronic device.

2. The handheld electronic device according to claim 1, further comprising an adhesive tape adhered between the housing and the cover to limit movement of the flashlight element relative to the housing.

3. The handheld electronic device according to claim 1, wherein the housing comprises a positioning pin, the substrate has a positioning hole, and the positioning pin and the positioning hole are engaged to limit movement of the flashlight element relative to the housing.

4. The handheld electronic device according to claim 1, wherein the elastic conductive terminal set comprises a plurality of elastic conductive terminals, and each of the elastic conductive terminals comprises a first end and a second end.

5. The handheld electronic device according to claim 4, wherein the first end is fixed to the circuit board and the second end leans against the flashlight element.

6. The handheld electronic device according to claim 4, wherein the first end is fixed to the flashlight element and the second end leans against the circuit board.

7. The handheld electronic device according to claim 1, further comprising a camera, mounted to the housing and electrically connected with the circuit board.

8. The handheld electronic device according to claim 1, further comprising a display, mounted to the housing and electrically connected with the circuit board.

9. The handheld electronic device according to claim 1, further comprising an outer cover, having a displaying opening, wherein when the outer cover and the housing are assembled to each other, a portion of the flashlight element is exposed through the displaying opening.

10. A flashlight module adapted for a handheld electronic device, the handheld electronic device comprising a housing and a circuit board, the housing having an accommodating opening, the flashlight module comprising:
a flashlight element, adapted for being inserted into the accommodating opening; and
an elastic conductive terminal set, fixed to the flashlight element and adapted for leaning against the circuit board and being disposed between the circuit board and the flashlight element, wherein the circuit board and the flashlight element are electrically interconnected through the elastic conductive terminal set, a distance is formed between the circuit board and the flashlight element, and the distance is adjustable by the elastic conductive terminal set, wherein the flashlight element comprises:
a substrate, abutting the elastic conductive terminal set;
a light emitting diode, mounted to the substrate; and
a cover, mounted to the substrate and assembled into the accommodating opening, wherein the light emitting diode is located between the substrate and the cover and is covered by the cover, the light emitted from the light emitting diode of the flashlight element is perpendicular to the circuit board, and the light from the light emitting diode directly passes through the cover, and the light guided by the accommodating opening is directly emitted out of the handheld electronic device.

11. The flashlight module according to claim 10, wherein the elastic conductive terminal set comprises a plurality of elastic conductive terminals, each of the elastic conductive terminals comprises a first end and a second end, the first end is fixed to the flashlight element, and the second end leans against the circuit board.

12. A handheld electronic device comprising:
a housing, having an accommodating opening;
a circuit board, disposed at a bottom of the housing;
a flashlight element, inserted into the accommodating opening;
an elastic conductive terminal set, disposed between the circuit board and the flashlight element, wherein the circuit board and the flashlight element are electrically interconnected through the elastic conductive terminal set, a distance is formed between the circuit board and the flashlight element, and the distance is adjustable by the elastic conductive terminal set; and
an adhesive tape,
wherein the flashlight element comprises:
a substrate, abutting the elastic conductive terminal set;
a light emitting diode, mounted to the substrate; and
a cover, mounted to the substrate and assembled into the accommodating opening, wherein the light emitting diode provides a light that emits through the cover, and the adhesive tape is adhered between the housing and the cover to limit movement of the flashlight element relative to the housing.

13. The handheld electronic device according to claim 12, wherein the elastic conductive terminal set comprises a plurality of elastic conductive terminals, and each of the elastic conductive terminals comprises a first end and a second end.

14. The handheld electronic device according to claim 13, wherein the first end is fixed to the circuit board and the second end leans against the flashlight element.

15. The handheld electronic device according to claim 13, wherein the first end is fixed to the flashlight element and the second end leans against the circuit board.

16. The handheld electronic device according to claim 12, further comprising a camera, mounted to the housing and electrically connected with the circuit board.

17. The handheld electronic device according to claim 12, further comprising a display, mounted to the housing and electrically connected with the circuit board.

18. The handheld electronic device according to claim 12, further comprising an outer cover, having a displaying opening, wherein when the outer cover and the housing are assembled to each other, a portion of the flashlight element is exposed through the displaying opening.

19. A handheld electronic device comprising:
a housing, having an accommodating opening;
a circuit board, disposed at a bottom of the housing;
a flashlight element, inserted into the accommodating opening; and
an elastic conductive terminal set, disposed between the circuit board and the flashlight element, wherein the circuit board and the flashlight element are electrically interconnected through the elastic conductive terminal set, a distance is formed between the circuit board and the flashlight element, and the distance is adjustable by the elastic conductive terminal set, wherein the flashlight element comprises:
  a substrate, abutting the elastic conductive terminal set;
  a light emitting diode, mounted to the substrate; and
  a cover, mounted to the substrate and assembled into the accommodating opening, wherein the light emitting diode provides a light that emits through the cover, wherein the housing comprises a positioning pin, the substrate has a positioning hole, and the positioning pin and the positioning hole are engaged to limit movement of the flashlight element relative to the housing.

20. The handheld electronic device according to claim 19, wherein the elastic conductive terminal set comprises a plurality of elastic conductive terminals, and each of the elastic conductive terminals comprises a first end and a second end.

21. The handheld electronic device according to claim 20, wherein the first end is fixed to the circuit board and the second end leans against the flashlight element.

22. The handheld electronic device according to claim 20, wherein the first end is fixed to the flashlight element and the second end leans against the circuit board.

23. The handheld electronic device according to claim 19, further comprising a camera, mounted to the housing and electrically connected with the circuit board.

24. The handheld electronic device according to claim 19, further comprising a display, mounted to the housing and electrically connected with the circuit board.

25. The handheld electronic device according to claim 19, further comprising an outer cover, having a displaying opening, wherein when the outer cover and the housing are assembled to each other, a portion of the flashlight element is exposed through the displaying opening.

26. A flashlight module adapted for a handheld electronic device, the handheld electronic device comprising a housing and a circuit board, the housing having an accommodating opening, the flashlight module comprising:
  a flashlight element, adapted for being inserted into the accommodating opening; and
  an elastic conductive terminal set, fixed to the flashlight element and adapted for leaning against the circuit board and being disposed between the circuit board and the flashlight element, wherein the elastic conductive terminal set is immovable relative to the flashlight element, the circuit board and the flashlight element are electrically interconnected through the elastic conductive terminal set, a distance is formed between the circuit board and the flashlight element, and the distance is adjustable by the elastic conductive terminal set.

27. The flashlight module according to claim 26, wherein the flashlight element comprises:
  a substrate, abutting the elastic conductive terminal set;
  a light emitting diode, mounted to the substrate; and
  a cover, mounted to the substrate and assembled into the accommodating opening, wherein the light emitting diode provides a light that emits through the cover.

28. The flashlight module according to claim 26, wherein the elastic conductive terminal set comprises a plurality of elastic conductive terminals, each of the elastic conductive terminals comprises a first end and a second end, the first end is fixed to the flashlight element, and the second end leans against the circuit board.

* * * * *